Patented June 9, 1931

1,809,318

UNITED STATES PATENT OFFICE

OSKAR SPENGLER, OF BERLIN-NEUBABELSBERG, AND WERNER MÜLLER, OF LEIPZIG, GERMANY, ASSIGNORS TO GENERAL ANILINE WORKS, INC., OF NEW YORK, N. Y.

MANUFACTURE OF SULPHUR CONTAINING DYES AND PRODUCT

No Drawing. Application filed April 30, 1927, Serial No. 188,039, and in Germany February 20, 1925.

The present invention relates to new sulphur-containing dyestuffs and to a process of preparing them.

The parent organic substance is treated with a sulphocyanogen or an agent yielding sulphocyanogen and the sulphocyanogen compound thus produced is converted into the dye by a treatment with an alkali. As parent materials are particularly suitable amino- and hydroxyaryl compounds and the various derivatives of such compounds which are adapted to be transformed into dyestuffs and in some cases are already dyestuffs.

Simple aromatic amines, such as aminobenzene, and hydroxy compounds, such as hydroxybenzene and hydroxynaphthalene, have been shown to be capable of substitution by means of sulphocyanogen (Söderback, Annalen der Chemie, 419, page 217; Kaufmann, Ber. d. pharmaz. Gesellschaft, 33,144). It could not be foreseen, however, from the existing state of knowledge that even several sulphocyanogen groups can be introduced with similar ease into complicated dyestuff components or even dyestuffs of high molecular weight which contain amino-groups or hydroxy-groups or both of these.

The sulphocyanogen compounds serving as intermediate products may advantageously be made by the process described in U. S. Letters Patent No. 1,594,697 and No. 1,687,596 by causing solutions obtainable by double decomposition between a halide of sulphuric acid and a sulphocyanate to react on an amino- or hydroxyaryl-compound.

By boiling the compound containing sulpho-cyanogen with alkali or alkali sulphide there is obtained, particularly if several sulphocyanogen groups are present in the molecule, a pure dyestuff soluble in alkali sulphide. If the sulphocyanogen compound is changed by boiling it with alkali sulphide there is obtained a solution from which, by acidification or by passing a current of air, the leuco-compound of the dyestuff or the dyestuff itself can be precipitated.

The process can be carried out easily with compounds having the aforesaid qualifications which cannot be converted by the usual agents or can be converted only very incompletely into sulphur-containing dyestuffs soluble in alkali sulphide. The process yields very pure dyestuffs characterized in particular by the clarity of their dyeings.

The following examples illustrate the invention, the parts being by weight:—

*Example 1.*—To a suspension of 2.5 parts of 8-hydroxy-1.2-naphthophenazine of the probable formula:

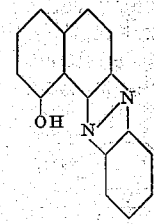

in 30—50 parts of carbon tetrachloride is added a solution made by the reaction of 4.1 parts of sulphuryl chloride with 12 parts of lead sulphocyanate in 50 parts of carbon tetrachloride. Almost immediately the azine is changed to a dark, nearly insoluble resinous substance; this is filtered and gradually solidifies to a brown crystalline powder.

4 parts of this azine containing sulphocyanogen are introduced gradually into 75 parts of a boiling aqueous solution of sodium disulphide, whereby a deep blue solution is produced. After this has been boiled for a short time it is diluted with about 250 parts of boiling water and then filtered. When the filtrate has cooled to about 50° C. the leuco-compound of the sulphur-containing dyestuff is precipitated in the form of yellow orange flocks by cautious addition of acetic acid. Fiber dyed in a sodium sulphide vat of this material becomes a clear orange yellow when the leuco-compound is oxidized on the fiber; this dyeing is characterized by its excellent fastness, particularly to chlorine.

*Example 2.*—To a suspension of 3 parts of 8.8'-dihydroxy-1.2.1'.2'-dinaphthazine of the probable formula:

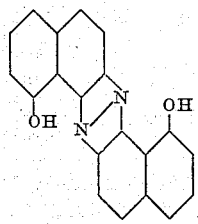

in 50 parts of carbon tetrachloride is added a solution made by the reaction of 8.1 parts of sulphuryl chloride with 30 parts of lead sulphocyanate in 130 parts of carbon tetrachloride. The yellow brown azine gradually becomes a dark red brown body completely insoluble. The mass is left for some 15 minutes in ice-water whereupon the azine containing sulphocyanogen is obtained in the form of a red crystalline powder.

5 parts of this sulphocyanogen derivative of the azine are introduced gradually into 80 parts of a boiling aqueous solution of sodium disulphide of 50 per cent. strength. After boiling for about half-an-hour the deep blue solution is diluted with about 900 parts of boiling water and then filtered and the product is worked up as described in Example 1. The red brown dyestuff thus obtained yields a clear red of excellent fastness when oxidized on the fiber.

*Example 3.*—To a suspension of 5 parts of tri-diphenylamine-methanehydrochloride of the probable formula:

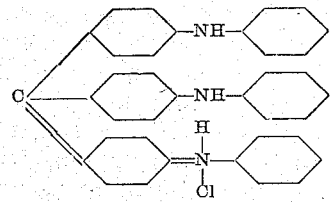

in 100 parts of chloroform is added a solution made by the reaction of 8.1 parts of sulphuryl chloride with 30 parts of lead sulphocyanate in 50 parts of chloroform. The parent material very quickly dissolves to a deep blue solution. After cooling with ice-water and vigorously shaking the solution, there crystallizes in a short time the sulphocyanogen product which after 20 minutes is filtered; it is a copper red crystalline powder of bronze lustre.

8 parts of this dyestuff containing sulphocyanogen are dissolved in boiling alcohol when there are added 50 parts of an aqueous solution of sodium sulphide of 50 per cent. strength, whereupon the solution becomes violet red. When it has been boiled for some hours it is filtered hot and after addition of 100 parts of water the alcohol is distilled. From the nearly colorless aqueous solution acetic acid precipitates the leuco-compound of the sulhur-containing dyestuff in the form of nearly colorless flocks. Cotton is dyed by the dyestuff clear blue tints.

*Example 4.*—To a suspension of 3.5 parts of tolusafranine of the probable formula:

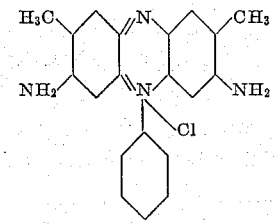

in 100 parts of carbon-tetrachloride there is added a solution made by reaction of 5.4 parts of sulphuryl chloride with 16 parts of lead sulphocyanate in 70 parts of carbon tetrachloride. There is immediately produced a dark, insoluble resinous product of reaction which, after filtration soon becomes a black crystalline powder of feeble bronze lustre.

7 parts of this compound containing sulphocyanogen are dissolved in 50 parts of a boiling aqueous solution of sodium disulphide of 50 per cent. strength. The solution is gradually mixed with 400 parts of boiling water and after filtration is worked up as described in Example 1. The leuco-compound oxidizes on the fiber to a reddish violet.

Having now particularly described and acertained the nature of our said invention and in what manner the same is to be performed, we declare that what we claim is:—

1. A process of making sulphur-containing dyestuffs which comprises treating an aromatic compound containing at least one of the groups, $-NH_2$ and $-OH$, with a solution containing the reaction product of a sulphurylhalide and a sulphocyanate and treating the sulphocyanogen compound thus produced with an alkaline substance at a temperature not exceeding essentially 100° C.

2. A process of making sulphur-containing dyestuffs which comprises treating an aromatic compound containing at least one of the groups, $-NH_2$ and $-OH$, with a compound yielding sulphocyanogen and treating the sulphocyanogen compound thus produced with an alkaline substance at a temperature not exceeding essentially 100° C.

3. A process of making sulphur-containing dyestuffs which comprises treating an aromatic compound containing at least one of the groups, $-NH_2$ and $-OH$, with a solution containing the reaction product of a sulphurylhalide and a sulphocyanate and boiling the sulphocyanogen compound thus produced with an alkali metal sulphide at a temperature not exceeding essentially 100° C.

4. A process of making sulphur-containing dyestuffs which comprises treating an aromatic azine containing at least one of the groups, $-NH_2$ and $-OH$, with a solution containing the reaction product of a sulphurylhalide and a sulphocyanate and boiling the sulphocyanogen compound thus produced with an alkali metal sulphide.

5. A process of making sulphur-containing dyestuffs which comprises treating an aromatic azine containing at least one $-OH$ group, with a solution contaiining the reaction product of a sulphurylhalide and a sulphocyanate and boiling the sulphocyanogen compound thus produced with an alkali metal sulphide.

6. A process of making sulphur-containing dyestuffs which comprises treating 8.8'-dihydroxy-1.2.1'.2'-dinaphthazine with a solution containing the reaction product of a sulphurylhalide and a sulphocyanate and boiling the sulphocyanogen compound thus produced with an alkali metal sulphide.

7. As new products, the sulphur-containing dyestuffs which may be produced by treating an aromatic compound containing at least one of the groups, $-NH_2$ and $-OH$, with a solution containing the reaction product of a sulphurylhalide and a sulphocyanate and treating the sulphocyanogen compound thus produced with an alkaline substance at a temperature not exceeding essentially 100° C.

8. As new products, the sulphur-containing dyestuffs which may be produced by treating an aromatic compound containing at least one of the groups, $-NH_2$ and $-OH$, with a solution containing the reaction product of a sulphurylhalide and a sulphocyanate and boiling the sulphocyanogen compound thus produced with an alkali metal sulphide at a temperature not exceeding essentially 100° C.

9. As new products, the sulphur-containing dyestuffs which may be produced by treating an aromatic azine containing at least one of the groups, $-NH_2$ and $-OH$, with a solution containing the reaction product of a sulphurylhalide and a sulphocyanate and boiling the sulphocyanogen compound thus produced with an alkali metal sulphide.

10. As new products, the sulphur-containing dyestuffs which may be produced by treating an aromatic azine containing at least one $-OH$ group, with a solution containing the reaction product of a sulphurylhalide and a sulphocyanate and boiling the sulphocyanogen compound thus produced with an alkali metal sulphide.

11. As a new product, a sulphur-containing dyestuffs which may be produced by treating 8.8'-dihydroxy-1.2.1'.2'-dinaphthazine with a solution containing the reaction product of a sulphurylhalide and a sulphocyanate and boiling the sulphocyanogen compound thus produced with an alkali metal sulphide, said dyestuffs being a red-brown substance dyeing fiber from a sodium sulphide vat a clear red shade of excellent fastness.

In testimony whereof we affix our signatures.

OSKAR SPENGLER.
WERNER MÜLLER.